Oct. 4, 1960 P. G. BINNS 2,954,990
FLEXIBLE JOINT MEMBER FOR DUCTING
Filed Nov. 15, 1957 2 Sheets-Sheet 2
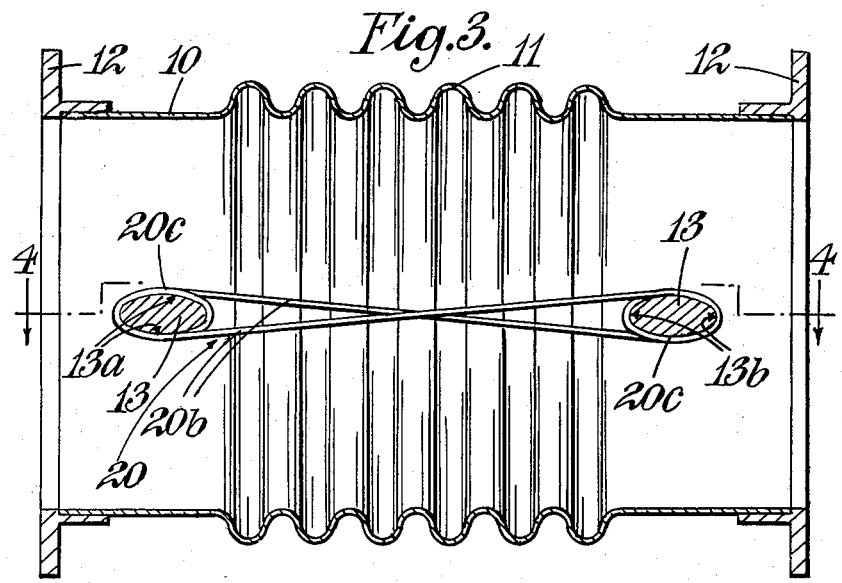
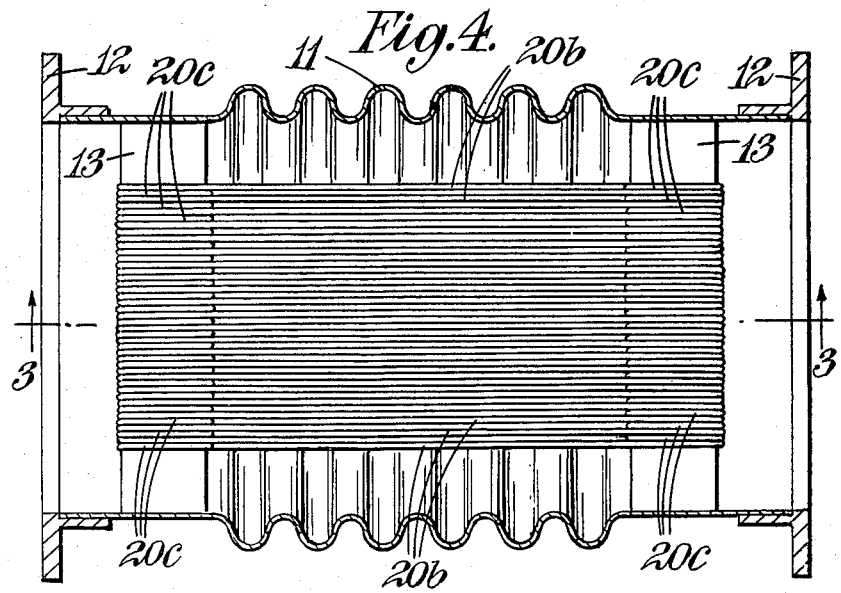
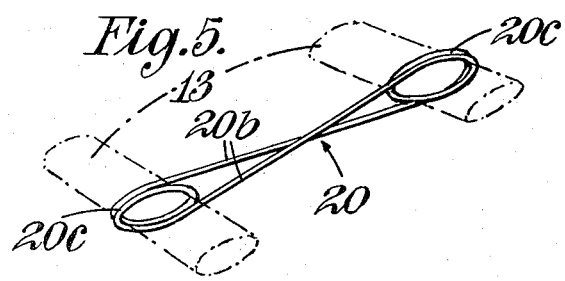

United States Patent Office 2,954,990
Patented Oct. 4, 1960

2,954,990

FLEXIBLE JOINT MEMBER FOR DUCTING

Philip Gordon Binns, Littleover, England, assignor to Rolls-Royce Limited, Derby, England, a British company Filed Nov. 15, 1957, Ser. No. 696,854

Claims priority, application Great Britain Nov. 21, 1956

10 Claims. (Cl. 285—114)

This invention comprises improvements in or relating to flexible joints for fluid ducting.

In many forms of machinery or apparatus, it is necessary to provide a joint between sections of ducting carrying a fluid under high pressure, which permits the ducting sections to tilt relative to one another, the plane containing the axes of the ducting sections being maintained constant throughout the tilting. It is known to provide a joint for this purpose which consists of a length of corrugated pipe, which acts bellows-wise, the corrugations being provided externally with heavy braiding which takes the end thrusts on the corrugations created by the pressure fluid in the ducting sections, but the braiding not only increases the weight of the joint, often to an undesirable extent, but also reduces the flexibility of the joint.

This invention has for an object to provide an improved form of joint member for joining sections of ducting for carrying fluid under high pressure, whereby these disadvantages are mitigated.

According to the present invention, a joint member for connecting ducting sections which are required to tilt in a single plane, comprises a corrugated pipe capable of withstanding high internal pressures and also of permitting the desired degree of tilt, the pipe having a plurality of spindles secured thereto, the spindles being spaced apart along the axis of the pipe, the spindle axes being parallel, extending transversely of the centre line of the pipe and being contained in a plane at right angles to the plane of tilt, and at least one cable wound on the spindles to provide a plurality of stretches of cable between the spindles, each stretch running from one side of one spindle diagonally between the spindles to the opposite side of the other spindle.

Preferably there are a pair of spindles, one adjacent each end of the pipe.

According to one arrangement of the invention, there is a single cable wound on the spindles to provide a multiplicity of diagonally-extending stretches, and in another arrangement there are provided a plurality of cables each wound on the spindles to provide two diagonally-extending stretches of cable between adjacent spindles.

In use, the cable is tensioned by and supports the thrust loads, and, in bending of the corrugated pipe, each stretch of cable unwinds from one spindle and winds up on the other spindle so maintaining the tension in the cable uniform and presenting no restriction to bending of the pipe.

According to a preferred feature of this invention, the spindles are oval in section and have the portions of larger radius of curvature facing laterally of the pipe centre line and the portions of smaller radius of curvature facing axially of the pipe.

According to another preferred feature of this invention, the spindles are within the corrugated pipe and extend from one side thereof to the other.

Two constructions of joint member of this invention will now be described with reference to the accompanying drawings, in which.

Figure 1:
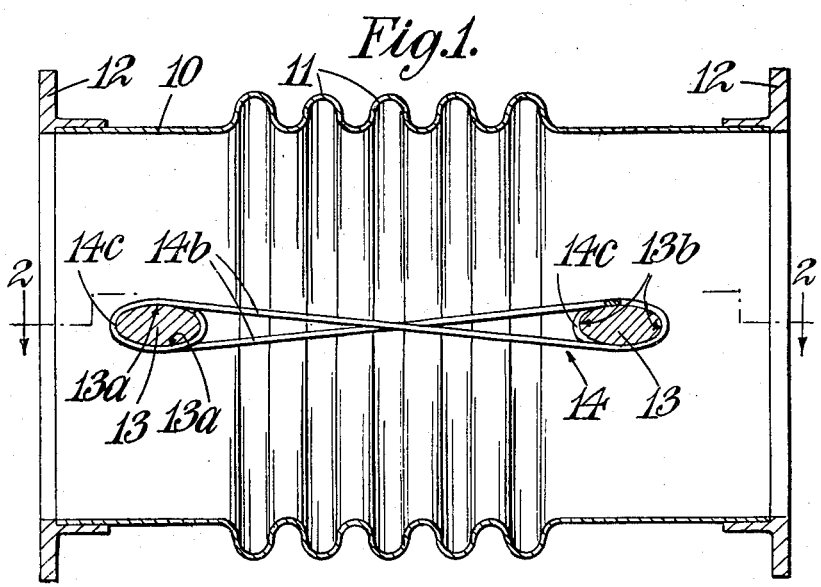
Figure 1 is a section through one construction of joint member on the plane in which its centre line is to be maintained in bending.
Figure 2:
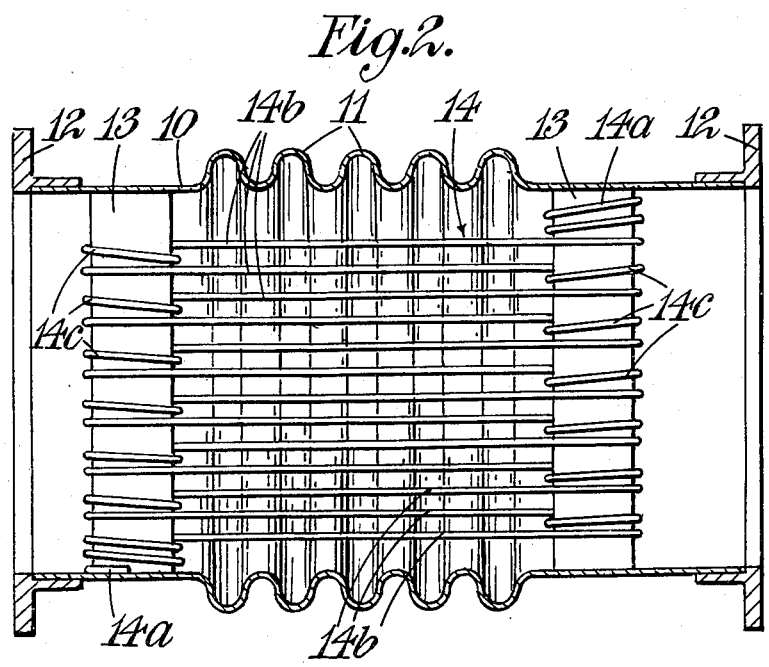
Figure 2 is a section on the line 2—2 of Figure 1, the plane of section being at right angles to that of Figure 1 and containing the centre line of the joint member.

Figures 3 and 4 are views corresponding to Figures 1 and 2 and show a second construction of joint, Figure 3 being a section on the line 3—3 of Figure 4, and Figure 4 being a section on the line 4—4 of Figure 3, and Figure 5 is a diagrammatic illustration of part of the construction of Figures 3 and 4.

The joint members illustrated may be employed, for example, joining sections of feed lines conveying propellant to rocket motors at high pressure.

The joint member (Figures 1 to 4) comprises a length of pipe 10 which is formed between its ends with a series of circumferential corrugations 11 so that the pipe 10 can expand and contract bellows-wise and thus accommodate bending. The pipe 10 is fitted with bolting flanges 12 by which it is attached to adjacent ducting sections which are required to tilt relatively in operation so that the centre line of pipe becomes curved in the plane of section of Figure 1.

To carry the end thrusts, the following arrangement is provided. A spindle 13 is secured in the pipe 10 adjacent each flange 12 to extend across the flow path with the spindle axis at right angles to and intersecting the centre line, the spindle axes thus being parallel. The plane containing the spindle axes is perpendicular to the plane (i.e. the plane of section of Figure 1) which always contains the centre line of the pipe. The spindles 13 are of oval cross-section, and have their largest radius of curvature portions 13a facing the walls of the pipe 10 and their smallest radius of curvature portions 13b facing along the centre line of the pipe 10.

In the construction of Figures 1 and 2, a cable 14 is wound on the spindles to provide a series of stretches 14b of cable which extend from one surface 13a of one spindle diagonally to the oppositely-facing surface 13a of the other spindle with turns of cable 14c around the spindles between each stretch 14b, and the cable 14 is anchored by its ends 14a to the spindles 13. It will be seen that the stretches 14b of cable extend alternately along one diagonal and the other diagonal.

In the construction of Figures 3 to 5, the spindles 13 have a series of endless cables 20 extending between them. Each cable 20 (Figures 3 and 5) provides two diagonally extending stretches 20b with a turn 20c of cable around each spindle.

The radius of curvature of the portions 13a will be chosen such as to ensure that, in deformation of the joint, the cable 14 or each cable 20 flexes within the limit of the elastic range, the limit of such range having been raised by the initial application of pressure within the joint. The radius of curvature of the portions 13b can be small, since in deformation of the joint the cable 14 or 20 passing over these portions is not subjected to flexing.

On bending of a joint formed by the joint member, the stretches 14b or 20b of cable extending along one diagonal will be fed say from the left-hand spindle 13 to the right-hand spindle 13, and the alternate stretches will be fed from the right-hand spindle 13 to the left-hand spindle 13. Thus end thrusts are supported whilst bending of the pipe 10 is not restricted. Also by having the spindles 13 shaped as above described it can be ensured that the cable 14 or 20 is not overstressed in use due to bending around the spindles when winding and unwinding on them.

The spindles 13 can, alternatively, be of egg-shaped cross-section, the radius of curvature of the outer portion being greater than the radius of curvature of the inner portion. Thus the overall width of the spindles is kept small but the correct curvature is provided for the loops of cable.

I claim:

1. A joint member for connecting ducting sections which are required to tilt in a single plane, comprising a corrugated pipe capable of withstanding high internal pressures and also of permitting the desired degree of tilt, the pipe having a plurality of spindles secured thereto, the spindles being spaced apart along the axis of the pipe with the corrugations therebetween, the spindle axes being parallel, extending transversely of the centre line of the pipe and being contained in a plane at right angles to the plane of tilt, and cable wound on the spindles to provide at least four stretches of cable between the spindles, each stretch running directly from one side of one spindle diagonally between the spindles to the opposite side of the other spindle and at least a pair of said stretches running generally parallel to the pipe's centre line spaced on one side of said centre line and at least the other pair being spaced on the other side of said centre line with the stretches of each of said pairs extending diagonally oppositely.

2. A joint member for connecting ducting sections which are required to tilt in a single plane, comprising a length of pipe formed over a central portion thereof with a series of circumferential corrugations, attachment members secured on the pipe at each end thereof, a pair of spindles secured in the pipe to extend diametrically across the pipe, the spindles being positioned one adjacent each end of the pipe axially between the central corrugated portion and the attachment member, the spindles having their axes parallel and contained in a plane at right angles to said single plane, the spindles having an oval cross-section comprising a pair of oppositely-facing portions of a first and large radius of curvature one on each side of the plane containing the axes of the spindles and facing the wall of the pipe and a second pair of oppositely-facing portions of a second and small radius of curvature facing axially of the pipe, and cable wound on the spindles and providing at least four stretches of cable, each stretch extending generally parallel to the pipe axis directly from one spindle to the other and running diagonally between the spindles from one large radius of curvature portion of one spindle to the oppositely-facing large radius of curvature portion of the other spindles, each stretch of cable running diagonally oppositely to each adjacent stretch of cable, there being at least two such stretches of cable spaced from the pipe axis on one side thereof and at least two stretches of cable spaced from the pipe axis on the other side thereof.

3. A joint member according to claim 1, comprising a pair of spindles, one adjacent each end of the pipe.

4. A joint member according to claim 1, comprising a single cable wound on the spindles to provide a multiplicity of diagonally-extending stretches of cable.

5. A joint member according to claim 1, comprising a plurality of cables, each cable providing two diagonally-extending stretches of cable between adjacent spindles.

6. A joint member according to claim 1, having a turn of cable wound on each spindle between and joining each pair of diagonally-extending stretches provided by the cable.

7. A joint member according to claim 1, wherein the spindles are oval in section and have the portions of larger radius of curvature facing laterally of the pipe centre line and the portions of smaller radius of curvature facing axially of the pipe.

8. A joint member according to claim 1, wherein the spindles are within the corrugated pipe and extend from one side thereof to the other.

9. A joint member according to claim 2, comprising a single cable wound on the spindles to provide a large number of stretches, the cable also being wound around to provide a turn of cable on a spindle between each pair of stretches.

10. A joint member according to claim 2, comprising a series of endless cables, each cable wound on the spindle to provide two stretches of cable extending respectively along one diagonal and the other and a turn of cable around each spindle between the two stretches.

References Cited in the file of this patent

UNITED STATES PATENTS

| | | |
|---|---|---|
| 973,901 | Witzenmann | Oct. 25, 1910 |
| 1,559,112 | Lujan | Oct. 27, 1925 |
| 1,886,332 | Flavin | Nov. 1, 1932 |
| 2,418,800 | Wilson | Apr. 8, 1947 |

FOREIGN PATENTS

| | | |
|---|---|---|
| 262,058 | Switzerland | Sept. 16, 1949 |
| 695,015 | Great Britain | Aug. 5, 1953 |